United States Patent [19]

Bihler et al.

[11] Patent Number: 5,271,261

[45] Date of Patent: Dec. 21, 1993

[54] PROCESSING MACHINE FOR PROCESSING WIRE AND STRIP STOCK OR FOR ASSEMBLING COMPONENTS

[75] Inventors: Otto Bihler, Halblech, Fed. Rep. of Germany; Eduard Brüller, Trimbach, Switzerland

[73] Assignee: Otto Bihler Maschinenfabrik GmbH & Co., Halblech/Fussen, Fed. Rep. of Germany

[21] Appl. No.: 868,455

[22] Filed: Apr. 14, 1992

[30] Foreign Application Priority Data

Apr. 17, 1991 [DE] Fed. Rep. of Germany ....... 4112571

[51] Int. Cl.⁵ .............................................. B21F 1/00
[52] U.S. Cl. ........................................ 72/442; 72/384; 72/444; 72/446; 72/472; 140/105
[58] Field of Search ................ 72/383, 384, 446, 472, 72/449, 442, 444; 140/105

[56] References Cited

U.S. PATENT DOCUMENTS

| | | | |
|---|---|---|---|
| 4,203,477 | 5/1980 | Bruller et al. | 72/384 |
| 4,532,794 | 8/1985 | Mauderer | 72/442 |
| 4,696,178 | 9/1987 | Bihler et al. | 72/384 |

FOREIGN PATENT DOCUMENTS

| | | |
|---|---|---|
| 3205493 | 9/1983 | Fed. Rep. of Germany . |
| 3234981 | 6/1986 | Fed. Rep. of Germany . |

*Primary Examiner*—David Jones
*Attorney, Agent, or Firm*—Brumbaugh, Graves, Donohue & Raymond

[57] ABSTRACT

A stamping and bending machine comprises a drive housing with a drive housing visual wall and two drive housing face walls. From each of the drive housing face walls projects at least one housing box. Processing devices are attachable to the housing boxes. A distributor gear is provided within the drive housing. Each of the housing boxes accommodates a housing box shaft drivingly connected with a distributor gear and with the processing devices.

35 Claims, 9 Drawing Sheets

PROCESSING MACHINE FOR PROCESSING WIRE AND STRIP STOCK OR FOR ASSEMBLING COMPONENTS

BACKGROUND OF THE INVENTION

The invention relates to a processing machine, especially an automatic stamping and bending machine for the processing of stock in wire and strip form, comprising a drive unit with a drive housing and with a distributor gearing accommodated within the drive housing and attached to a drive motor, where the drive housing comprises two mutually opposite and mutually substantially parallel drive housing face walls and at least one drive housing visual wall substantially orthogonal to the drive housing face walls, where further the distributor gear comprises in a first drive housing face wall at least one first shaft connection with axis of rotation substantially perpendicular to the first drive housing face wall, where furthermore this first drive housing face wall is formed in the surrounding region of the at least one shaft connection for the attachment of a first housing box where further this first housing box comprises a face wall attachment face for the attachment to the first drive housing face wall and at least one housing box visual wall substantially parallel to the drive housing visual wall, where further in the first housing box there is mounted at least one housing box shaft intended and suitable for attachment to the at least one first shaft connection and extending with its axis substantially orthogonally to the first face wall attachment face, where furthermore on the housing box visual wall there is provided at least one securing location for a processing unit and furthermore in the housing box visual wall at least one opening is provided for the production of a drive connection between the processing unit and the housing box shaft.

STATEMENT OF THE PRIOR ART

Such a processing machine is known for example from DE-OS 3,205,493.

In the known processing machine two housing boxes issuing from one and the same drive housing face wall extend in the same direction to an end box. Between the two housing boxes a passage is formed. Each of the housing boxes comprises in its housing box visual wall a plurality of securing points for processing units. An opening is allocated to each of these fastening points. A worm wheel shaft is inserted into each opening. Each worm wheel shaft carries a worm wheel. The worm wheels are in engagement with a housing box shaft formed as worm wheel, within the housing. The ends of the worm wheel shafts close the housing openings. On the ends of the worm wheel shafts in the region of the housing openings there are fitted coupling elements. The processing units can be secured to the housing box visual wall. In the processing units there are mounted attachment shafts which each comprise a countercoupling element for coupling with the coupling element of the respective worm wheel shaft. Thus the processing units can be fitted at any desired points, that is in association with any desired bores, along the respective housing box, and brought into drive connection with the worm shaft within the housing box. The two housing boxes are of a sufficient length, so that a plurality of processing units can be fitted on the respective housing box visual face in each case.

The known processing machine further comprises in the region of the drive housing an intake device by means of which a strip or wire material can be introduced into the region of the processing units and transported in the longitudinal direction of the two lengthy housing boxes. Furthermore in the region of the drive housing a stamping press is provided by means of which punching tasks can be carried out on the strip material or wire material. It is also possible for individual workpieces to be cut off from the strip or wire stock by this stamping press. These pieces then can be processed further on the way along the lengthy housing boxes, for example by bending, stamping, drilling, thread drilling or joining together with parts supplied from elsewhere, i.e. assembling.

It can readily be seen that the housing boxes can be fitted, according to length, with a plurality of processing units. Thus it becomes possible to process long workpieces. Likewise it becomes possible, if appropriate transport means are present, to subject individual, even relatively short workpieces to a plurality of processing actions.

The length of the housing boxes depends upon the length of the workpieces to be worked and/or upon the number of processing actions to be carried out on the workpieces. The longer the workpieces, in the direction of length of the housing boxes, and/or the greater the number of the processing actions to be carried out, the greater naturally does the length of the housing boxes become.

The housing box shafts, formed as worm shafts, within the housing boxes can be driven at a relatively high rotation rate, which then is geared down by the worm wheel, at the attachment points of the individual processing units. In this way it is possible to transmit the drive power to the individual drive units with a high rotation rate and correspondingly only relatively low torques in the housing box shafts. Even if at the attachment point of the processing units one provides great transmission ratio conditions, that is to say steps down from high rotation rates of the housing box shafts to low rotation rates of the processing units, the torques to be transmitted in the housing box shaft, that is for example in the worm shafts, can become relatively great, if the housing boxes and accordingly the housing box shafts become relatively long, as a result of a large number of required processing units. This problem arises especially when great processing forces are taken off at one or more processing units placed remote from the drive housing. Great torques in the housing box shafts subject these housing box shafts to torsion loading. This signifies that phase displacements occur due to shaft torsion between processing units close to the drive housing and processing units far from the processing housing. These phase displacements are difficult to take into consideration in the multiple processing of a workpiece, and lead to processing inaccuracies. In addition worm shafts can be produced, in practical production, only with limited length. If the housing boxes become very long, then the worm shafts housed in the housing boxes must be assembled from individual sections and separator couplings must be provided between successive sections of the worm shafts. These separator couplings are naturally loaded with the torque of the housing box shafts. During the life of a processing machine wear phenomena can occur in these separator couplings, which can lead to further angle errors which are difficult to monitor, and thus to phase displacements between processing units close to the drive housing and processing units remote from the drive housing.

From German Offenlegungsschrift No. 3,234,981 it is known to divide the housing boxes issuing from a drive housing face wall in one direction into individual sections and to accommodate single housing box shafts of appropriate, length in these individual sections. The housing box face walls are connected with one another by face sides and accordingly the shaft sections of mutually successive housing box sections are also connected with one another by face sides. In this known form of embodiment in addition to the already described problems there is also the further problem that the individual housing box sections can be aligned with one another exactly only with difficulty. The danger exists that the housing boxes, assembled from several sections, depart from rectilinearity and thus cause still further errors in processing.

OBJECT OF THE INVENTION

The invention is based upon the problem of forming a processing machine of the initially designated kind in such a way that for a given processing length the phase shifts due to torsion and wear between spaced processing units are reduced or completely avoided.

SUMMARY OF THE INVENTION

To solve this problem it is proposed in accordance with the invention that in a processing machine as defined above the distributor gearing in the second drive housing face wall comprises at least one second shaft connection with rotation axis substantially perpendicular to this drive housing face wall, and that this second drive housing face wall is formed for the attachment of a second, substantially corresponding housing box in the surrounding region of the at least one, second shaft connection.

With the configuration according to the invention it is possible to fit the drive housing to a certain extent at a middle point of the entire processing section, so that — considered perpendicularly of the visual walls of the drive housing and of the housing boxes — processing points lie to both sides of the drive housing. The length of the processing section is then determined by the sum of the length of the housing boxes placed on both sides of the drive housing and the extent of the drive housing in the longitudinal direction of the two housing boxes. This signifies that in the most favourable case of the arrangement of the drive housing in the geometrical centre of the entire processing length of the processing machine the length extent of the individual housing box shafts, that is especially worm shafts, only amounts to approximately half of the processing length. To each of the housing box shafts then in the ideal case only half of the total necessary processing units have to be coupled. This signifies that the torque loading and the length of the housing box shafts are approximately halved, and this further signifies that any phase shifts between processing units placed remotely from one another are reduced in the ideal case to half. At the same time the problem of worm shafts assembled by sections can be reduced or eliminated: if it is assumed that a total processing length A is necessary, then the individual housing box shafts have a length only of $\frac{1}{2} \times$ A (without consideration of the extent of the drive housing). Then under certain circumstances one can make do completely without sectionally divided gear box shafts. In any case however the number of division positions of the gear box shafts between the drive housing and the most remote processing unit can be reduced to half.

According to a preferred form of embodiment of the invention it is provided that a first shaft connection in the first drive housing face wall and a second shaft connection in the second drive housing face wall are arranged in axial alignment with one another and that housing boxes pertaining to the first and to the second shaft connections are fittable on the pertinent drive housing face walls in such a way that they are substantially aligned with one another in the axial direction of the pertinent housing box shafts. The entire housing, formed from drive housing and housing boxes, then assumes a substantially cruciform configuration. The processing of the workpieces can take place from the two housing boxes, arranged in alignment with one another, in a similar manner as if a continuous, correspondingly longer housing box were attached to a drive housing face wall of the drive housing.

The processing conditions on the processing machine in accordance with the invention can be largely adapted to the processing conditions on the processing machine known from German Offenlegungsscrift No. 3,205,493, in that on each of the first and the second drive housing face walls there are provided two first and second shaft connections with spacing from one another, a first and a second shaft attachment being in each case aligned with one another, and in the region of the two shaft connections of both drive housing face walls at least one housing box can be fitted. In this case, as already in the known processing machine according to DE-OS No. 3,205,493, the respective workpieces to be worked can be processed with two opposite processing directions.

With regard to the transport of the workpieces to be worked out of the region of the second housing box into the region of the first housing box or vice versa in each case over the drive housing it is advisable that the housing box visual walls of the first and if appropriate of the second housing box lie substantially flush with the drive housing visual wall. In this case there are no hindrances to the transport of the workpieces to be worked, by way of the drive housing. The workpieces, but also a still coherent strip or wire stock, can be transported over the drive housing without hindrance.

The drive housing can in principal be open on its side remote from the side visual wall, in order to render access possible to the distributor gear. Admittedly a solution is preferred such that the drive housing comprises a further drive housing visual wall substantially parallel to and spaced from the drive housing visual wall, which can be formed as a lid of the otherwise one-piece drive housing. In the case of this form of embodiment the distributor gear can be completely encapsulated within the drive housing. Thus the penetration of dirt to the distributor gear is suppressed. Moreover an oil bath can be maintained within the drive housing.

Likewise it is possible for the housing boxes in each case to comprise a further housing box visual wall substantially parallel to the further drive housing visual wall, that these further housing box visual walls should also each comprise at least one fastening point and that the further housing box visual walls should each comprise at least one fastening point and one opening for a processing unit, and that the further housing box visual walls lie substantially flush with the further drive housing visual wall. In this way, as already in the construction according to DE-OS 3,205,493, one obtains a processing machine with two mutually spaced processing planes, the two processing planes being free from hindrance in the region of the drive housing too, for the transport of the workpiece over the drive housing. It is pointed out that a passage can be present between two housing boxes which are equally directed, that is issue from one and the same drive housing face wall in the same direction. This passage then permits of transporting workpieces from a first processing plane to a second processing plane and of continuing the processing commenced in the first processing plane in the second processing plane. In this way the range of variation of the most various kinds of processing is again doubled. The existence of the gear housing is no trouble here, since even hitherto in the known construction according to DE-OS 3,205,493 the possibility of bridge-over pieces in the region of the passage was taken into consideration, and in the case of the construction according to the invention the existence of the gear housing between two adjacent passages does not act substantially differently from the existence, in the known form of embodiment, of a bridge-over piece between two neighbouring regions of a passage.

In the known form of embodiment according to DE-OS No. 3,205,493 the possibility is already indicated, at the ends of the housing boxes remote from the drive housing of connecting these boxes with one another by an additional end construction. In the construction in accordance with the invention too, the possibility exists that the housing boxes comprise at their ends remote from the face wall attachment faces an end box attachment face for attachment in each case to an end wall of an end box. Thus the construction according to the invention receives not only a comparable rigidity, but a still greater rigidity than the construction known from DE-OS No. 3,205,493, the increase of the rigidity being based on the existence of the drive housing between the two ends of the processing machine.

As known from DE-OS No. 3,205,493, it is possible for the housing boxes, considered in a plane of section perpendicular to the shaft axial direction in each case, to possess a substantially rectangular outline which is formed in each case by two mutually parallel and spaced visual walls and in each case two connecting walls connecting these visual walls. Thus the housing box shafts are also completely encapsulated, so that they too can run in an oil bath, and the oil baths of the housing boxes can communicate with the oil bath of the drive housing. The design assembly of the drive boxes is here basically selectable at will. However a form of embodiment will be preferred in which in each case a visual wall and two connecting walls form a basic frame of the housing box, in which the respective housing box shaft is mounted accessibly for servicing, and the further visual wall is made as a removable lid.

With regard to the monitoring and if necessary influencing of the operation of processing the workpieces, DE-OS No. 3,205,493 provides that two mutually parallel processing planes stand substantially vertically on the front and the rear of housing boxes. This can also be realised readily in the case of the embodiment according to the invention, namely in that the drive housing and possibly one or two end boxes are formed each as vertical column. More especially the basic assembly according to DE-OS No. 3,205,493 can be realised, adopting the basis of the principle of construction according to the invention, in that two housing boxes are arranged one above the other on at least one drive housing face wall of the drive housing.

The drive housing and the end boxes can be arranged on a basic carrier, for example on a base plate, which is adapted in each case to the total machine length and lies or is anchored on the floor of a workshop.

The basic assembly in each case of the processing machine, consisting of drive housing, housing boxes possibly with end boxes and basic carrier is in principle executed in the production works of the machine. The adaptation of the machine thus delivered from the production works of the machine to the operator of the machine, to different workpieces takes place exclusively by attachment of the most various processing units, such as material intake devices, processing carriages, presses and the like, to the machine, the fundamental assembly of which remains unchanged.

The formation of the distributor gear within the drive housing can be according to wish. Admittedly it is important to assemble the distributor gear so that the extent of the drive housing in the direction of projection of the housing boxes becomes as little as possible, in order that the sequence of the processing units can be made with minimum possible spacing even in the region of the drive housing. This requirement can for example be fulfilled in that the distributor gear comprises at least one distributor shaft which, continuing from the first to the second drive housing face wall, connects a first shaft connection and a second shaft connection with one another.

If two housing boxes protruding in different directions are fitted on each drive housing face wall, the distributor gear is preferably formed in a manner such that it comprises two mutually parallel and mutually spaced distributor shafts which, extending continuously from the first gear housing face wall to the second gear housing face wall, in each case connect a first shaft connection and a second shaft connection with one another. Here an especially simple gear connection results between the two distributor shafts, due to the fact that these are connected fast in rotation each with a distributor toothed wheel, that between the two distributor toothed wheels an intermediate toothed wheel is mounted on an intermediate shaft in the drive housing, and that one of the distributor shafts is connected for drive through a transmission gear with the drive motor.

The intermediate shaft thus comes into the region of a passage between two housing boxes and can be formed at one end at least for the drive of an auxiliary shaft. This auxiliary shaft can here be mounted, exclusively or additionally, between two housing boxes fitted on one and the same drive housing face wall. This auxiliary shaft can serve for the drive of the most various auxiliary units, and especially a transport apparatus which is intended and suitable to transport workpieces for processing substantially orthogonally to the visual walls of the two housing boxes through between these.

The attachment points of the distributor gear can be made as separator couplings, especially as plug-in couplings, and the housing boxes can be detachably connected with the drive housing and possibly with the end boxes. The length of the housing boxes and of the pertinent housing box shafts on both sides of the drive housing can be determined by the manufacturer according to the client's order in each case; thus it is also possible with one type of drive housing and with a few types of housing boxes to build different types of processing machines. Fundamentally it is also possible to fit a housing box, or several housing boxes, only on one face wall of the drive housing.

Thus a design results such as is known in principle from DE-OS No. 3,205,493. Moreover the housing boxes fitted on one face wall of the drive housing can be made identical and possibly arranged in mirror image to one another about a plane of symmetry in mid height of the passage. Thus, as likewise also already known from DE-OS No. 3,205,493, the number of the necessary housing boxes for the assembly of the processing machine is further reduced.

In principle it is possible to fit the housing box shafts with toothed wheels, especially bevel gears, and to bring the processing units into engagement with these toothed wheels. Admittedly a solution will be preferred to the effect that the housing box shafts are formed as worm shafts and that these worm shafts are in engagement with worm wheels of pertinent processing units.

As already known from DE-OS No. 3,205,493, it is possible to fit the worm wheels permanently in the housing boxes in each case so that they remain constantly in engagement with the worm shaft. Accordingly then the worm wheel shafts will be formed, at one end at least in each case, with a separator coupling element which permits the connection with one drive shaft in each case of a processing unit. This signifies that in the attachment and dismantlement of a processing unit to and from a housing box, no intervention must be effected in the gearing parts within the housing box concerned. The housing boxes can rather remain constantly closed, which is also advantageous with regard to the possible preparation of an oil bath within the housing boxes.

Since, as already mentioned at the outset, it is difficult to manufacture worm wheels of great length, in the case of appropriately great lengths of the housing boxes it can be advantageous to divide housing box shafts made as worm shaft into a plurality of worm shaft sections which are mounted at the division point and are connected with one another by a separator coupling each. The worm shaft sections can here comprise mutually complementary separator coupling elements at their ends, so that it is possible to obtain the worm shaft length necessary in each case by assembling shorter worm shaft sections of standardised length.

The assembly of the processing machine in accordance with the invention as before still permits wire and strip feed movement equipment and any necessary stamping presses being fitted in each case at the machine end, possibly on the end boxes. A preferred solution however consists in that the stamping press and/or feed apparatus are fitted on a housing box where a normal processing unit could also be fitted, so that the drive connection can then take place in accordance with the drive connection of normal processing units, by coupling to the respective housing shaft.

It is not to be excluded that at the ends of the housing box shafts remote from the drive housing additional drive systems are provided in order to relieve the housing box shafts still further from torques. Since however by the shortening of the housing box shafts as a result of the central arrangement of the drive housing in any case a torsional relieving of the housing box shafts is already achieved, this very expensive extra measure of additional drive is not necessary in the regular case.

If in accordance with the invention on a first drive housing face wall at least one first shaft connection is arranged and on an opposite drive housing face wall at least one second shaft connection is arranged, the latter possibly in alignment with the former, then these shaft connections, by reason of the formation of the distributor gear can in principle possess the same rotation rate. It is however also possible to have individual shaft connections rotating with different rotation rate, perhaps by the use of interposed reduction or step-up intermediate gears. The variation of the transmission ratio can prove advantageous for various machining tasks. If an intermediate shaft is provided, from which several distributor shafts are driven in common, and if this intermediate shaft in turn is again intended and formed to drive auxiliary shafts, then rotation rate increasing or decreasing intermediate gears can also be installed between the intermediate shaft and the auxiliary shafts.

If a reversing and/or distributor housing is attached to the drive nousing, again a rotation rate step-up or step-down can take place in this distributor housing.

BRIEF DESCRIPTION OF THE DRAWINGS

The invention is explained by reference to an example of embodiment by the accompanying Figures, wherein.

DETAILED DESCRIPTION OF THE PREFERRED EMBODIMENTS

Figure 1:
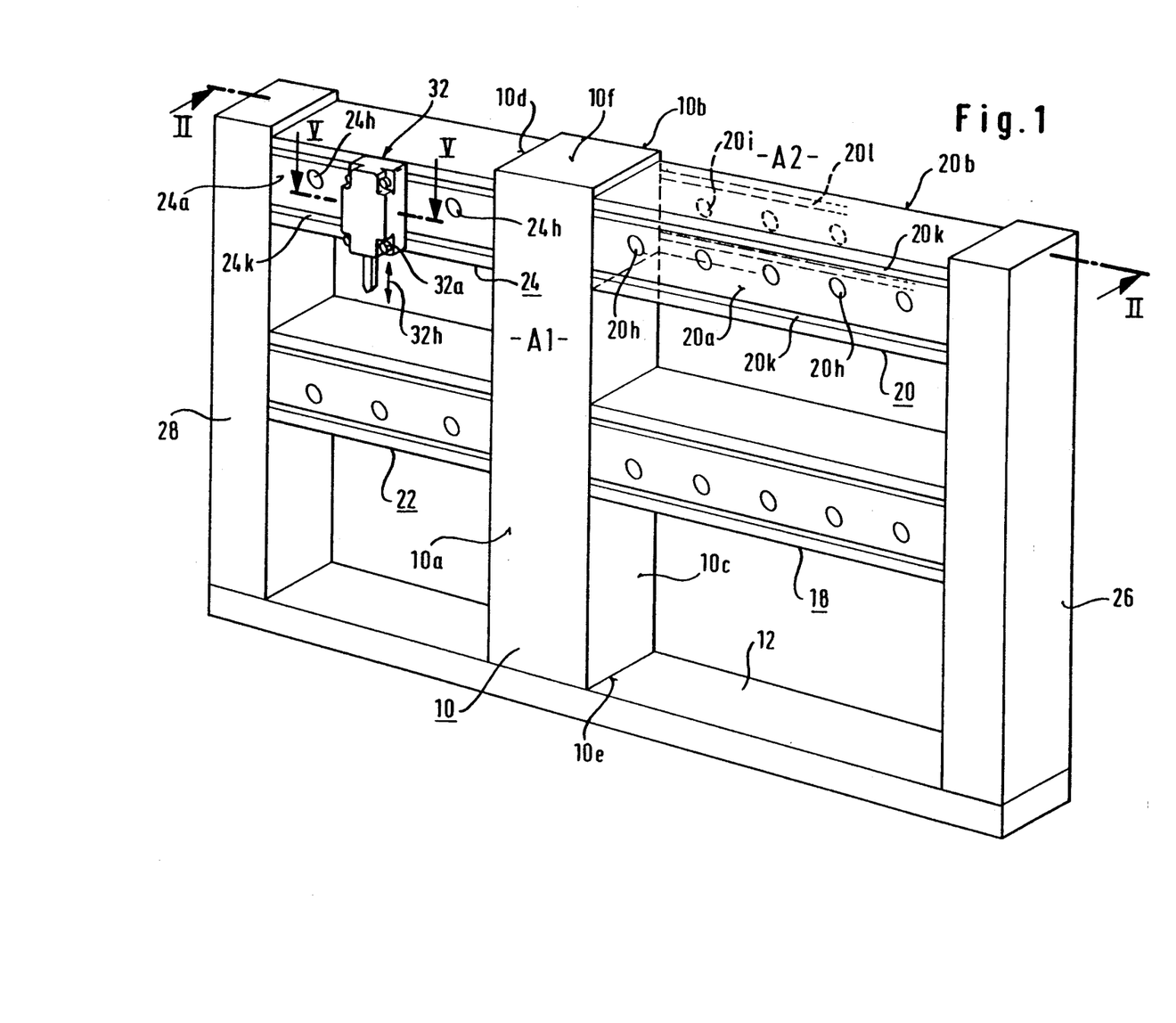
FIG. 1 represents a perspective view of a processing machine according to the invention.
Figure 2:
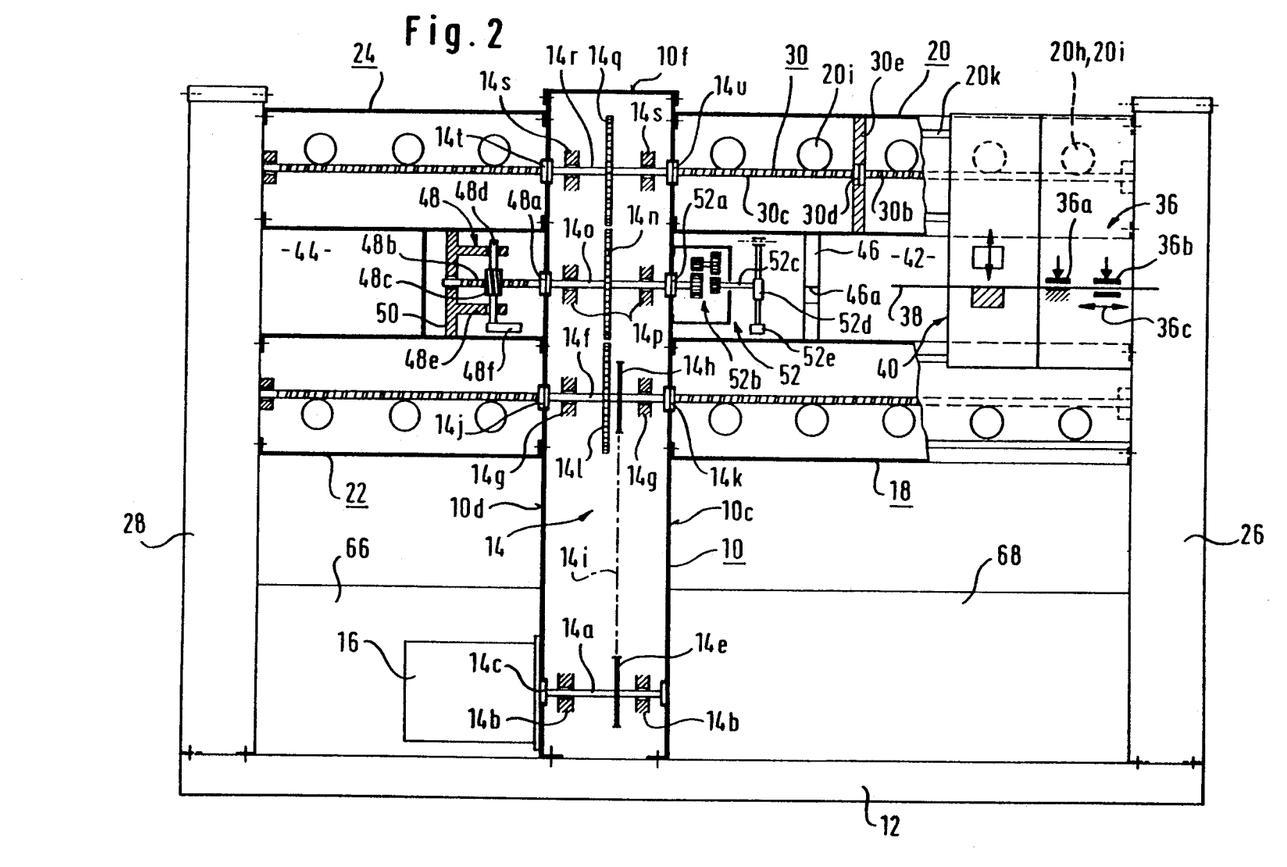
FIG. 2 shows a section in the vertical longitudinal central plane of the processing machine according to FIG. 1, along the line II—II in FIG. 1.

In the Figures a drive housing 10 which, as may be seen from FIG. 2 is secured, for example welded or screwed fast, on a base carrier 12. This drive housing comprises, as visible from FIGS. 1 and 3, two visual walls 10a and 10b and two face walls 10c and 10d. Furthermore the drive housing 10 comprises a floor surface 10e which rests against the base carrier 12. The drive housing 10 is upwardly closed off by a cover wall 10f. Within the drive housing 10 a distributor gear 14 is housed, as visible from FIG. 2. This distributor gear 14 comprises an input shaft 14a which is mounted in bearings 14b of the drive housing 10 and connected with a drive motor 16, namely by a separator coupling 14c. Between the drive motor 16 and the input shaft 14a there can also be provided a coupling-brake combination, which will be discussed in greater detail in the description of FIG. 7.

A chain wheel 14e is seated on the input shaft 14a.

Furthermore the distributor gear 14 comprises a first distributor shaft 14f mounted in bearings 14g of the drive housing 10. On the distributor shaft 14f a chain wheel 14h is seated which is connected by way of a chain 14i with the chain wheel 14e. At the two ends of the distributor shaft 14f separator couplings 14k, 14j are seated in openings of the face walls 10c and 10d. On the distributor shaft 14f there is further seated a toothed wheel 14l. This toothed wheel 14l is in engagement with an intermediate toothed wheel 14n arranged on an intermediate shaft 14o. The intermediate shaft 14o is carried in bearings 14p of the drive housing 10. The intermediate toothed wheel 14n is in engagement with a further toothed wheel 14q which is mounted by means of an upper distributor shaft 14r in bearings 14s of the drive housing 10, and carries at its two ends, in openings of the face walls 10c and 10d, separator couplings 14t and 14u. On the face wall 10c two housing boxes 18 and 20 are fastened by screwing or welding. Two further housing boxes 22, 24 are secured by screwing or welding, on the face wall 10d. The two ends of the housing boxes 18, 20 remote from the drive housing 10 are secured to an end box 26 by screwing or welding, which box in turn is secured to the base carrier 12 by screwing or welding. Correspondingly the ends of the two housing boxes 22, 23 remote from the drive housing 10 are welded or screwed with an end box 28, which in turn is welded or screwed on the base carrier 12.

Figures 3, 4:
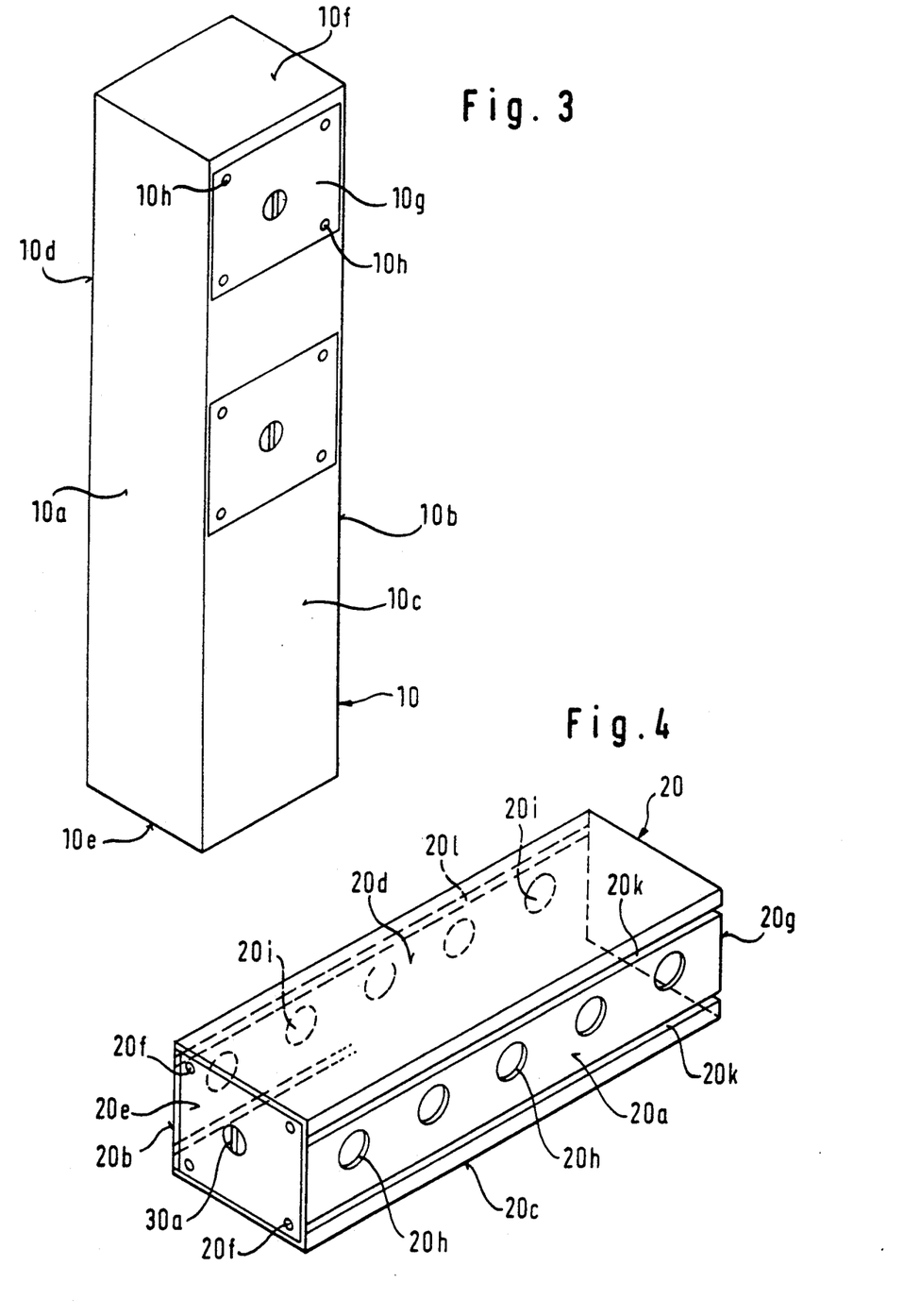
FIG. 3 shows a perspective view of a drive housing of the processing machine.
FIG. 4 shows a perspective view of a housing box of the processing machine.

Regarding the assembly of a housing box reference will be made to the illustration of the housing box 20 according to FIG. 4. This housing box 20 comprises two housing box visual walls 20a and 20b and two housing box connecting walls 20c and 20d. The housing box visual wall 20a and the housing box connecting walls 20c, 20d are made in one piece as a U-part, while the housing box visual wall 20b is made as a removable lid. The housing box 20 further comprises a face wall attachment face 20e for attachment to the drive housing face wall 10c. Bores 20f serving for the reception of tie bolts are indicated diagrammatically as connection means. At its right end in the Figure the housing box 20 comprises an end box attachment face 20g intended for attachment to the end box 26. Within the housing box 20, as may be seen from FIG. 2, a worm shaft 30 is mounted, of which there is visible in FIG. 4 only the one end formed as separator coupling element 30a. This separator coupling element 30a forms a component of the separator coupling 14u visible in FIG. 2.

As may further be seen from FIG. 2, the worm shaft 30 consists of two worm shaft sections 30b and 30c, which are connected with one another by a separator coupling 30d at a bearing point 30e, and also are carried in bearings in the region of the face wall attachment face 20e and of the end box attachment face 20g (FIG. 4) within the housing box 20. The housing box 20 according to FIG. 4 is secured to the drive housing 10 according to FIG. 3 in a fastening region 10g, and here again holes 10h are provided, for the diagrammatic indication of the fastening means. In the fitting of the housing box 20 to the drive housing 10, the separator coupling 14u is positively closed, for example in that a diametrical rib is fitted on the distributor shaft 14r and a diametrical groove on the separator coupling element 30 according to FIG. 4, the diametrical rib and the diametrical groove engaging with one another.

Openings 20h and 20i are provided in the visual walls 20a and 20b of the housing box 20.

The other housing boxes 18, 22 and 24 are of analogous formation, and in the case of the example the housing boxes 18 and 20 each have five holes and the housing boxes 22, 24 each have three holes, and the lengths are accordingly different.

The visual walls 10a and 20a of the drive housing 10 and of the housing boxes 20 form a first working plane A1; the visual walls 10b and 20b form a second working plane A2.

On the visual walls 20a and 20b of the housing box 20 there are provided T-grooves 20k and 20l serving for the fastening of processing units. In FIG. 1 a typical example is seen for a processing unit 32. This processing unit 32 is there fastened to the visual wall 24a by screws 32a which engage in the T-grooves 24k through the intermediary of groove blocks.

Figure 5:
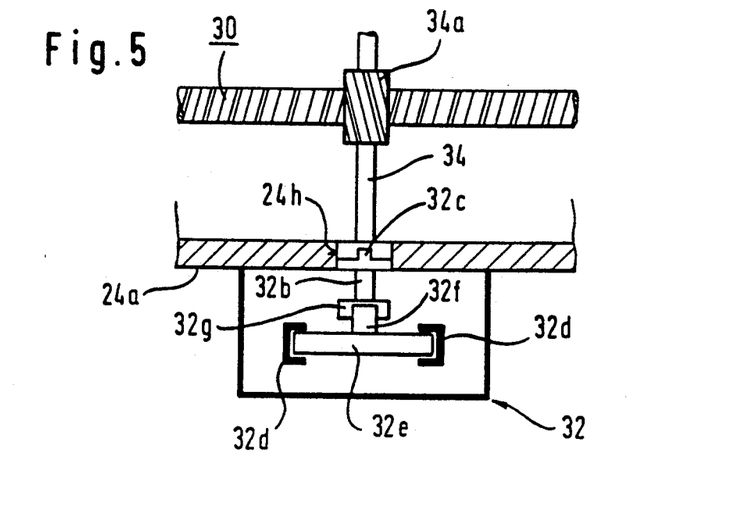
FIG. 5 shows a diagrammatic partial section along the line V—V of FIG. 1.

In FIG. 5 one sees the visual wall 24a and the processing unit 32 attached to it. The processing unit comprises a fixedly installed rotatable shaft 32b. This shaft 32b comes, on attachment of the processing unit 32 to the visual wall 24a, into engagement by means of push-in coupling elements 32c, with a worm wheel shaft 34, which is constantly rotatably mounted in an opening 24h of the visual wall 24a. On the worm wheel shaft 34 there is seated a worm wheel 34a which is in constant engagement with the worm shaft pertaining to the housing box 24, which worm shaft is here again designated by 30, analogously with the conditions in the housing box 20. In the processing unit 32 a guide 32d is provided in which a tool carriage 32e is mounted for displacement perpendicularly of the plane of the drawing in FIG. 5. This tool carriage 32e carries a cam follower 32f which is held in constant engagement with a drive cam 32g. The drive cam 32g is connected with the drive shaft 32b for rotation in common, so that by the rotating movement of the drive cam 32g, derived from the worm 30, an upward and downward movement of the tool carriage 32e is caused in the direction of the arrow 32h in FIG. 1.

All openings 20h and 20i of the housing box 20 are fitted with worm shafts in conformity with the worm shaft 34 according to FIG. 5. The same applies to the other housing boxes 18, 22 and 24. Thus a processing unit 32 can be secured to every opening of every housing box at any time and coupled for drive to the respective worm shaft 30. The housing boxes 18, 20, 22 and 24 are closed tightly by the worm wheel shafts 34 mounted in the openings 20h and 20i, so that the housing boxes 18-24 can each be filled with an oil bath. These oil baths can be in connection with an oil bath of the drive housing 10.

On the housing box 20 according to FIG. 2 a feed unit 36 is fitted. This feed unit 36 is driven by a drive as represented in FIG. 5 for a processing unit. The feed unit comprises a periodically opening and closing stationary tongs 36a and a periodically opening and closing movable tongs 36b. The tongs 36b is driven in reciprocation in the direction of the arrow 36c. The manner of operation of the feed unit 36 is as follows: the wire or strip stock 38 (see FIG. 2) is firstly grasped by the tongs 36b and advanced to the left. Then the tongs 36a closes and holds the material 38 fast. Thereupon the tongs 36b opens and moves to the right. If the tongs 36b has reached its right-hand end position, it closes again. Then the tongs 36a is opened and the tongs 36b can move to the left again, entraining the stock 38 by a feed step of defined length.

Furthermore according to FIG. 2 a stamping press 40 is fitted on the housing box 20. This stamping press 20 is again secured on the housing box 20 in exactly the same way as the processing unit 32 according to FIG. 1, and driven in exactly the same way as this unit (see FIG. 5). The wire or strip stock 38 advanced step by step by the feed device 36 can be pre-punched and if desired divided into small workpieces by the stamping press 40. If the wire or strip stock is divided into individual workpieces then for the further transport from the stamping press 40 to the left (FIG. 2) a special transport device is necessary, which is not illustrated).

Let it be assumed that the wire or strip stock 38 is first moved and processed in front of the processing plane A1 as shown in FIG. 2. For this purpose at each opening of the housing boxes 18, 20, 22, 24 a processing unit can be provided (see processing unit 32 in FIG. 1). The processing units can be of any desired kind and intended for bending, stamping, drilling, thread drilling, welding. Moreover processing units can be provided which are intended and suitable for joining individual workpieces, formed from the wire and strip stock, together with additional elements which can be brought forward by a further feed system (not shown).

If, starting from the right region of FIG. 2, a workpiece has been advanced towards the left end region of FIG. 2, and the processing steps by the processing units provided in the processing plane A1 are terminated, the workpiece in each case can be moved through between the two housing boxes 22 and 24 and thus come into the region of the second processing plane A2. There appropriate processing steps can be executed. More especially the possibility is borne in mind of carrying out the mechanical processing on the workpieces in the region of the 1st processing plane A1 and carrying out assembly operations in the region of the processing plane A2, especially connecting the workpieces processed in the processing plane A1 with additional components which are fed to the processing plane A2 by a feed apparatus (not shown).

The transition from the processing plane A1 into the processing plane A2 can also take place between the two housing boxes 18 and 20. The interspace between the housing boxes 18 and 20 is designated by 42, the interspace between the housing boxes 22 and 24 is designated by 44.

It is also to be added that for the processing of the workpieces the interspaces 42 and 44 can also be bridged over by bridge-over pieces 46 on which abutment pieces 46a are provided, so that the processing unit concerned can cooperate with a fixed abutment piece.

For transport through the passage 44 a transport mechanism 48 is provided. This transport mechanism is driven by the intermediate shaft 14o. On the left end of this intermediate shaft 14o there is situated a separator coupling 48a, which is capable of being coupled with an additional worm shaft 48b pertaining to the transport mechanism. The worm shaft 48b is rotatably mounted in a connection piece 50 between the two housing boxes 22 and 24. The worm shaft is in engagement with a worm wheel 48c which is carried by a vertically extending worm wheel shaft 48d. The worm wheel shaft 48d is mounted in bearings 48e on the connecting piece 50, and carries at its lower end a dog or an eccentric disc 48f, which can indirectly or directly effect the transverse transport of workpieces through the passage 44.

With regard to the transport mechanism 48 it is to be noted that this, thanks to the use of the worm shaft 48b, is driven with stepped down ratio in the same manner as the processing unit 32 and thus in the tempo of the processing can take over the transverse transport through the passage 44. The worm shafts 30 and 48b run with a relatively great rotation rate, while the worm wheel shafts 34 and 48d rotate with a greatly stepped-down lower rotation rate. This is significant, in order to be able to transmit a given power requirement at the respective processing point with low torsion moment in the worm shafts 30.

It is also to be ensured that the two toothed wheels 14l and 14q rotate in the same direction, so that to this extent too, the processing units driven by the upper and lower worm shafts can easily be adapted to one another.

On the right face wall 10c of the drive housing 10 an alternative transport mechanism 52 is represented. Here a toothed wheel step-down gear 52b, which drives a cam shaft 52c, is fitted on the intermediate shaft 14o, through a separator coupling 52a. The cam shaft 52c carries a cam 52d which acts upon a pivot lever 52e. The pivot lever 52e carries out oscillating movements in a vertical plane perpendicular to the plane of the drawing, and can again serve for the transport of workpieces between the processing planes A1 and A2.

The devices as represented at 48 and 52, which hitherto by way of example were called transport mechanisms, can be used not only for transport, but also, and preferably, for other movements perpendicular to the processing planes on both sides, especially for the drive of processing tools.

It is also possible to prolong the shafts 48b and/or 52c in the longitudinal direction of the housing boxes, so that several movements perpendicular to the processing planes A1 and A2 can be generated at any desired points along the housing boxes.

Figure 6:
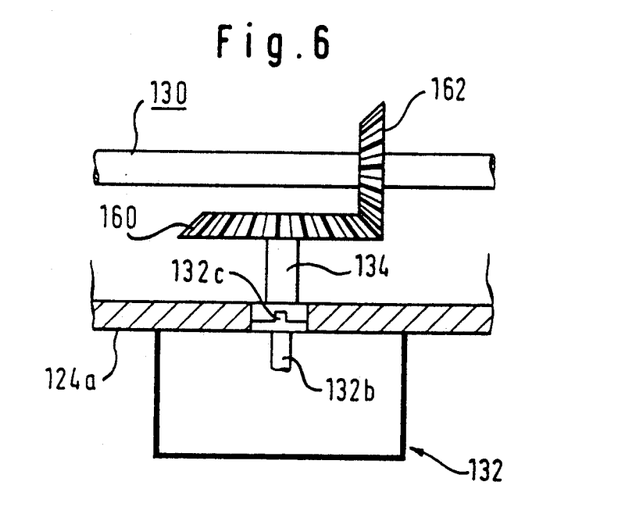
FIG. 6 shows a section corresponding to that of FIG. 5, in a modified form of embodiment.

In FIG. 6 there is represented an alternative drive for a processing unit 132. The processing unit 132 is secured on a visual wall 124a. Within the processing unit 132 a shaft 132b is mounted which is in drive connection through a separator coupling 132c with a shaft 134. The shaft 134 carries a bevel wheel 160 which stands with a further bevel wheel 162 on a shaft 130. In this case the shaft 130 replaces the worm shaft 30. The step-down ratio between the shaft 130 and the shaft 134 through the bevel wheels 160 and 162 is here so selected again, in accordance with the drawing, that the shaft 134 rotates substantially more slowly than the shaft 130, for example with a rotation rate stepped down in the ratio 1:4, so that here again a given power can be transmitted by the shaft 130 with great rotation rate and correspondingly small torque.

To facilitate the adjustment of the processing units it is advisable to set the shafts 34 and 134 respectively (FIGS. 5 and 6) each so that the pertinent separator couplings 32c and 132c assume conforming angle positions at every moment.

The base carrier 12 (FIG. 2) is adapted in each case to the length of the housing boxes 18–24 and unambiguously determines the total length of the processing machine. Between the drive housing 10 and the end boxes 26, 28 there can be installed intermediate boxes 66, 68 which correspond to the length of the housing boxes used in each case and are welded or screwed with the drive housing 10 and the end boxes 26, 28.

Figure 7:
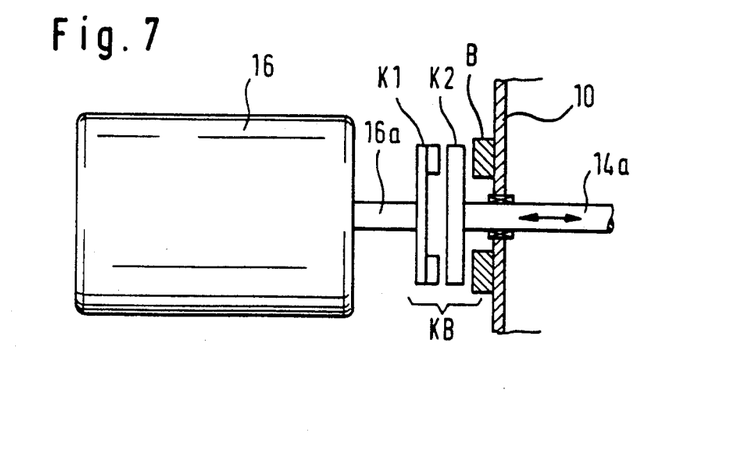
FIG. 7 shows a coupling-brake combination between drive motor and distributor gear.

In FIG. 7 there is seen the drive motor 16 as already illustrated in FIG. 2, a part of the gear housing 10 and the input shaft 14a. For the connection of the drive motor 16 with the input shaft 14a there serves here a coupling-brake combination KB. This coupling-brake combination comprises a first coupling disc K1 on the motor shaft 16a and a second coupling disc K2 on the input shaft 14a. On the drive housing 10 a brake disc B is further stationarily fitted. By displacement of the coupling disc K2 it is possible for the distributor gear 14 to be set in drive or braked, according to choice. In this way it is possible to bring the distributor gear and thus also all processing units and other peripheral equipment rapidly to a halt, if a fault in operation should be ascertained anywhere.

Figure 8:
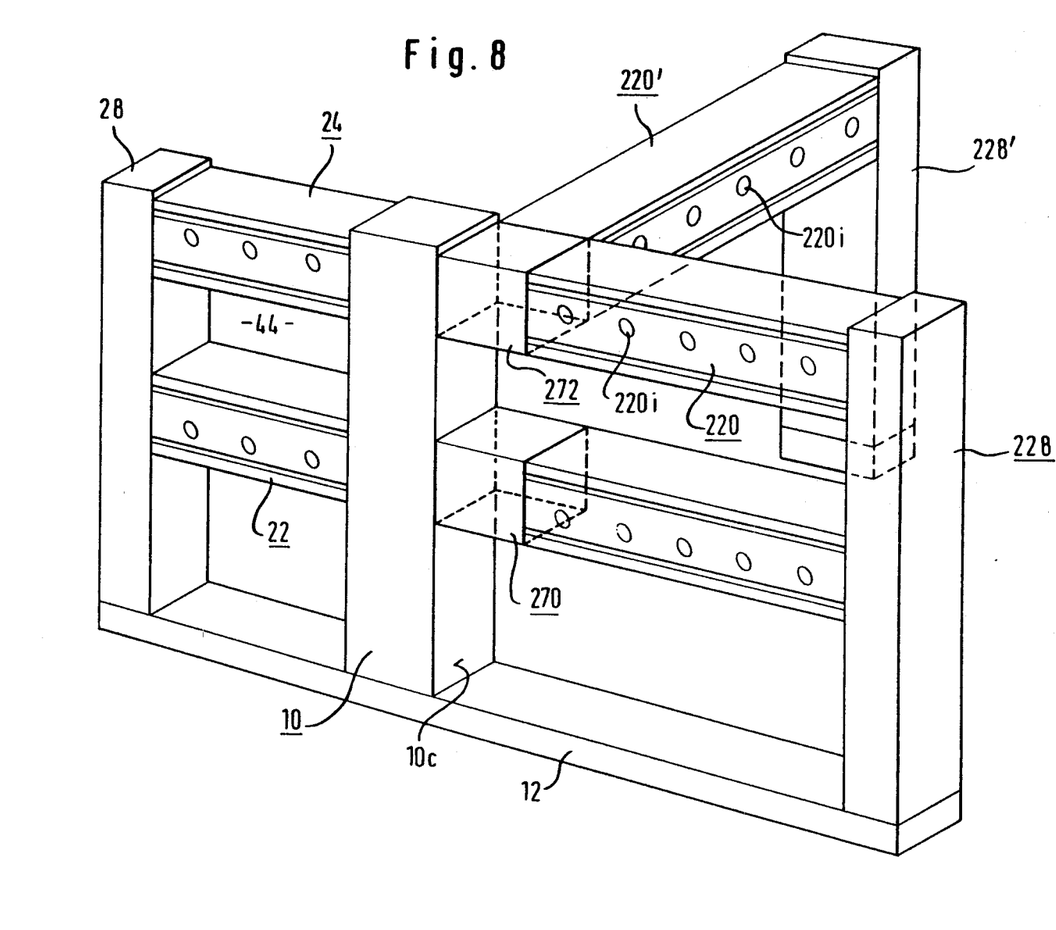
FIG. 8 shows a modification compared with FIG. 1.

In FIG. 8 there is shown a modification compared with the form of embodiment according to FIGS. 1 and 2. Analogous parts are provided with the same references as in FIG. 1. In FIG. 8 one again sees the drive housing 10, and one also sees that the assembly in FIG. 8 to the left of the drive housing 10 conforms with the assembly in FIG. 1 to the left of the drive housing 10 there. The drive housing 10 and the distributor gear (not shown in FIG. 8) are formed exactly as in FIGS. 1 and 2. In departure from the embodiment according to FIGS. 1 and 2 however now on the face wall 10c it is not housing boxes directly which are fitted, but deflector housings 270 and 272. The deflector housings 270 and 272 are identical with one another, so that it is sufficient to describe one of them.

Figure 9:
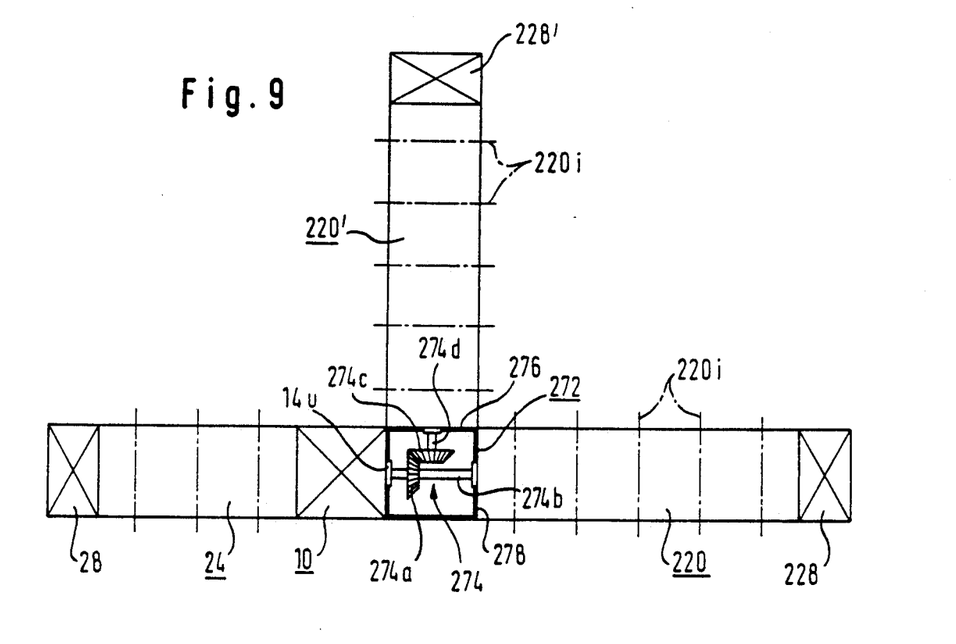
FIG. 9 shows a plan view of FIG. 8.

In the plan view according to FIG. 9 one recognises the drive housing 10 and also a diagrammatic section through the deflector housing 272. The deflector housing 272 accommodates a deflector gear 274. In the case of the example it is a matter of a bevel wheel gear 274 with a first bevel wheel 274a on a first bevel wheel shaft 274b and a second bevel wheel 274c on a second bevel wheel shaft 274d.

The deflector housing 272 is secured on the drive housing 10 in exactly the same way as in FIG. 1 the housing box 20 is secured to the drive housing 10. Furthermore the first bevel wheel shaft 274b according to FIGS. 8 and 9 is coupled to the distributor shaft 14r (represented in FIG. 2) in exactly the same way as in FIG. 2 the worm shaft 30 is coupled to the distributor shaft 14r. Therefore in FIG. 9 too a separator coupling 14u is also entered.

The deflector housing 272 possesses at least two attachment walls 276 and 278. Housing boxes 220 and 220' can be attached to these attachment walls. The housing boxes 220 and 220' are assembled analogously with the housing box 20 for example from the form of embodiment according to FIGS. 1 and 2. This applies especially to the attachment faces with which the housing boxes 220 and 220' are made, so that the housing boxes 220 and 220' can also be attached directly to the drive housing 10, as illustrated in FIG. 2. In the housing boxes 220 and 220' too there are mounted worm shafts (not shown), exactly as illustrated in FIG. 2. In the housing boxes there are provided bores 220i indicated in dot-and-dash lines, namely in mutually opposite visual walls. According to FIGS. 8 and 9 on the left ends of the housing boxes 22 and 24 an end box 28 is fitted, in conformity with FIG. 2. On the free ends of the housing boxes 220 and 220' there are fitted further end boxes 228 and 228' which can be formed exactly like the end boxes 28. In FIG. 8 there are shown no housing boxes pertaining to the lower deflector housing 270.

However it is readily comprehensible that housing boxes can be attached to the deflector housing 270 too, as to the deflector housing 272.

Figure 10:
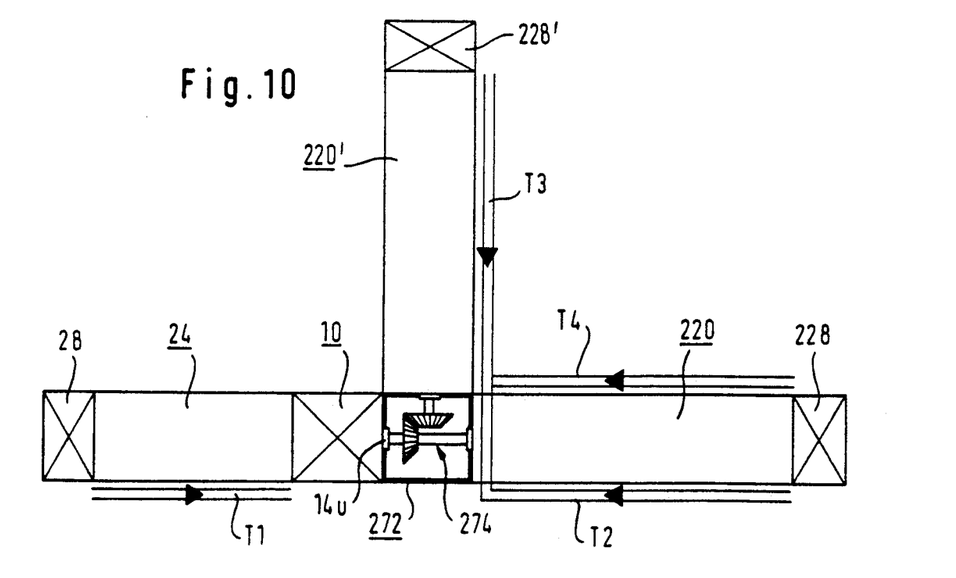
FIG. 10 shows a diagram of transport of strip and parts in the case of an arrangement according to FIGS. 8 and 9.

In FIG. 10 transport tracks T1, T2, T3 and T4 for wire and strip stock, but also for workpieces or workpiece parts, are illustrated. The arrows indicate directions of transport, by way of example. The basis is here adopted that the transport tracks extend at the height of the intermediate space 44 (FIG. 8) and thus can pass through between the upper and lower housing boxes. Thus it is possible to feed wire or strip stock, possibly also single parts, in different directions, and in other directions to conduct away the processed and assembled workpieces.

Figure 11:
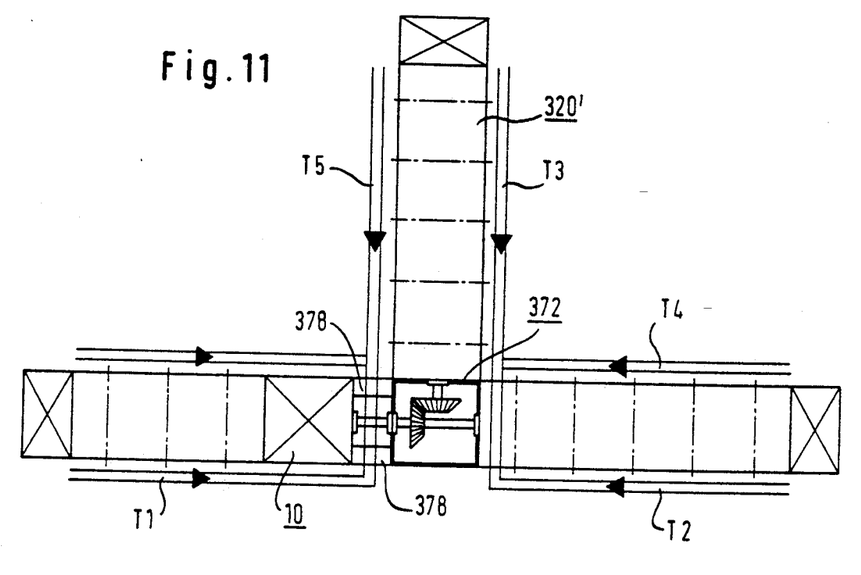
FIG. 11 shows a diagram of transport of strip and parts in the case or an arrangement further modified in comparison with FIGS. 8 and 9.

In FIG. 11 a modification compared with FIGS. 8–10 is represented. The modifications consists in that the deflector housing 372 is not connected with the drive housing 10 directly, but through the intermediary of distance pieces 378. Otherwise the arrangement according to FIG. 11 corresponds to FIGS. 8 to 10. The arrangement of the distance pieces 378 permits the formation of a further transport track T5 along the left defining plane, in FIG. 11, of the housing box 320' and the deflector housing 372.

Figure 12:
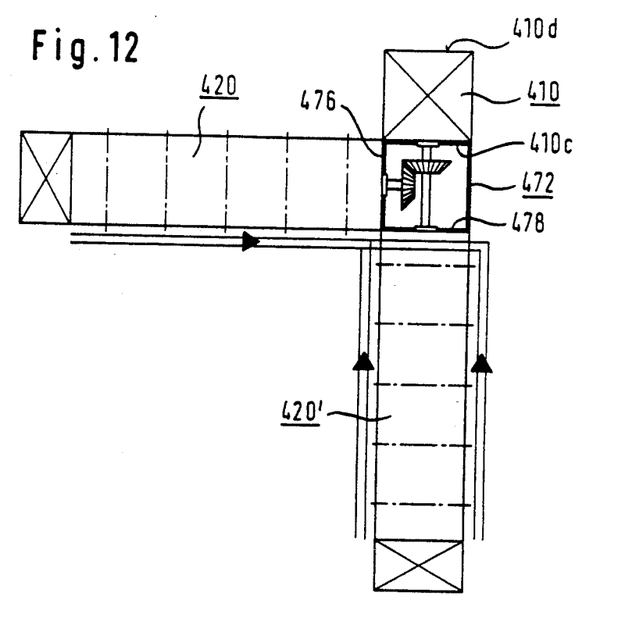
FIG. 12 shows a further modification of FIG. 1, again with a transport diagram of strip and parts.

Finally in FIG. 12 it is seen that one or more deflector housings 472 can be fitted on a drive housing 410 on only one side, and then a housing box 420 and/or 420' on each of two side walls 476, 478 of the deflector housing 472. The deflector housing 472 is here provided on one face wall 410c of the drive housing 410, while no fittings are present on the face wall 410d. Nevertheless the drive housing 410 can be formed exactly as represented in FIG. 11.

In FIG. 12 again possible transport tracks for wire and strip stock and for components and finished workpieces are indicated by arrows.

Figure 13:
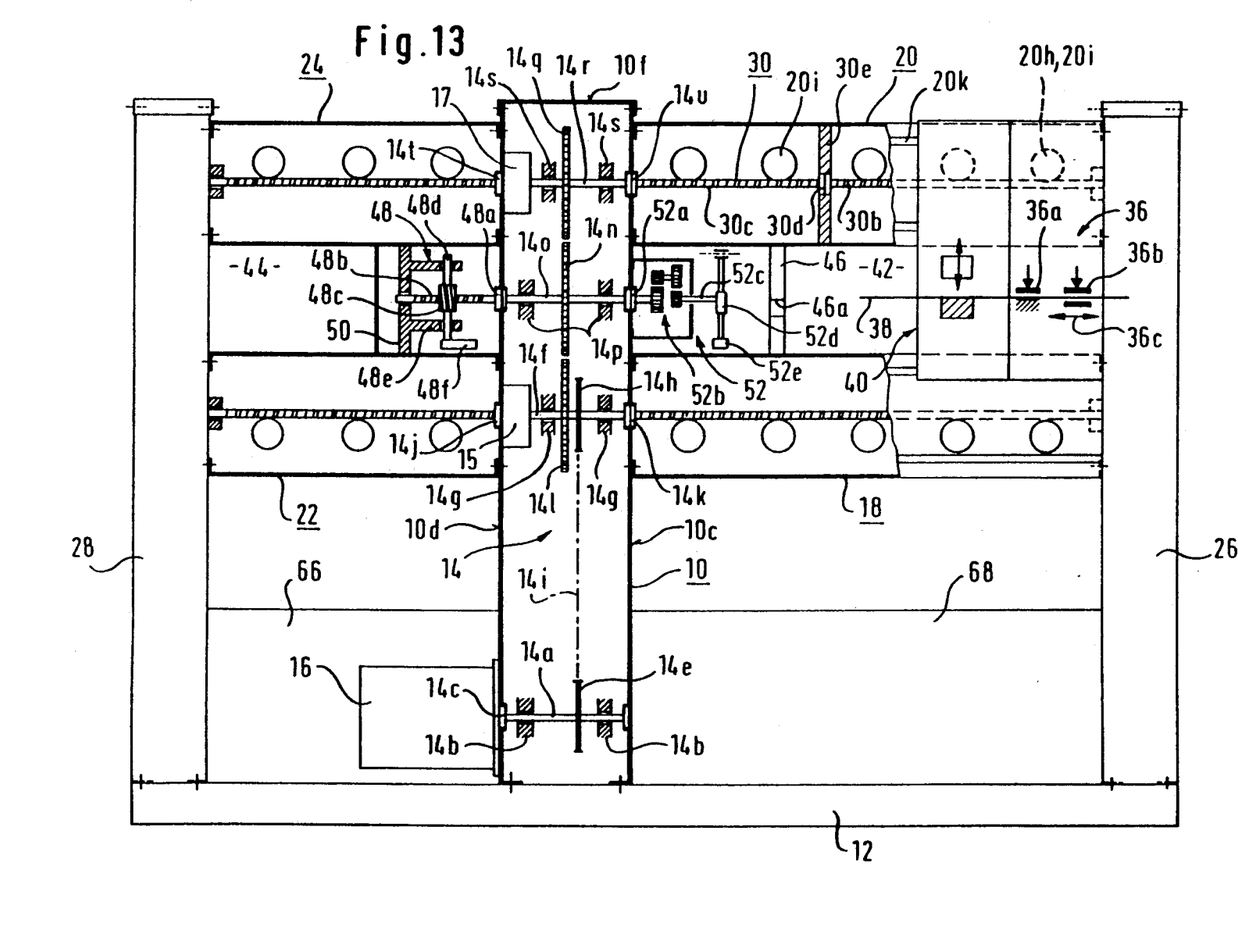
FIG. 13 shows a modification compared with FIG. 2, where different rotation rates can be taken off from the two face walls of the drive housing.

The form of embodiment according to FIG. 13 corresponds essentially to the form of embodiment according to FIG. 2. In modification compared with the form of embodiment according to FIG. 2,, different rotation rates can be taken off from the shaft connections (separator couplings) 14j and 14t, from those on the shaft connections (separator couplings) 14k and 14u. This means that the worm shafts in the housing boxes 22 and 24 lying on the left can be driven with different rotation rates, smaller or greater, than the worm shafts in the housing boxes 18 and 20. For this purpose in FIG. 13 intermediate gears 15 and 17 are provided. The intermediate gears 15 and 17 are connected on the input side each with a distributor shaft 14f or 14r and on the output side each with a separator coupling 14j or 14t, as the case may be.

In this way for example the execution of the following processing task is rendered possible: on the right side of the machine in FIG. 13 individual plates are manufactured, for example 100 per minute. These plates are gathered in packets of 5 each and transported on to the left half of the machine. The left half of the machine then has the task of interconnecting the single plates of the packets each comprising 5 plates. For this purpose slower working is necessary on the left half of the machine. For this purpose the worm shafts on the left side of the machine can be caused to rotate with 1/5th of the rotation rates with which the worm shafts on the right side of the machine rotate.

In principle it would be possible for all 4 worm shafts according to FIG. 13 to rotate all with different rotation rates.

The rotation rates of the auxiliary shafts 52c and 48b can again be adapted by appropriate step-up or step-down ratios to the different rotation rates of the pertinent worm shafts. For example the spur wheel gear 52b according to FIG. 13 can be formed as step-up or step-down gear.

The idea of driving individual worm shafts at different rotation rates can also be utilised in the machine constructions according to FIGS. 9 and 10. Thus the bevel wheel gear 274 in FIGS. 9 and 10 can also be formed as step-up or step-down gears.

Figure 14:
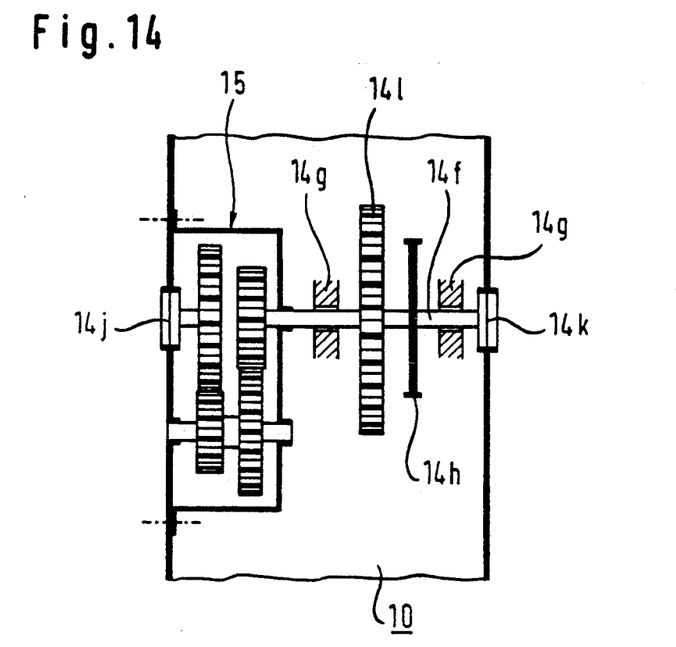
FIG. 14 shows a first form of embodiment of an intermediate gear for installation into the drive housing according to FIG. 13

In FIG. 14 one sees details of the step-down gear 15. This step-down gear 15 is formed as spur wheel gear which is driven by a distributor shaft 14f and drives the separator coupling 14j with a rotation rate departing from the rotation rate of the distributor shaft 14f.

Figure 15:
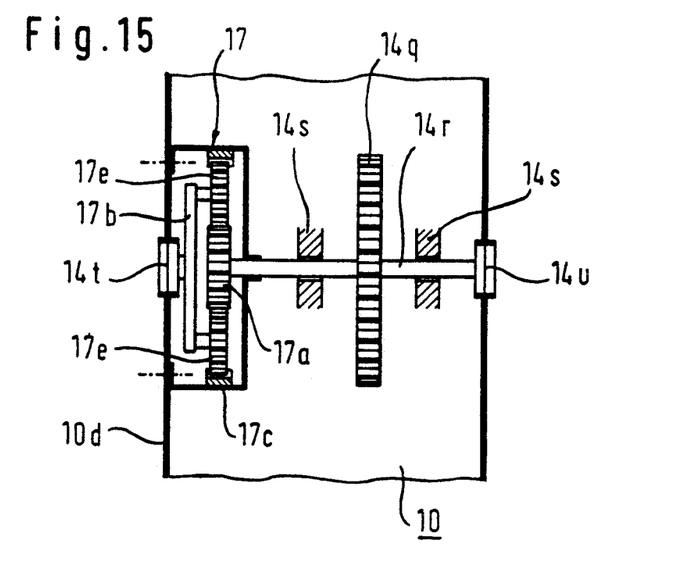
FIG. 15 shows a second form of embodiment of an intermediate gear for installation into the drive housing according to FIG. 13.

In FIG. 15 there is seen an intermediate gear 17 formed as planet gear 17. Here the distributor shaft 14r drives the sun wheel 17a, while the planet wheel carrier 17b drives the separator coupling 14t. The ring wheel 17c is flanged to the face wall 10d. The planet wheels 17e are in tooth engagement with the sun wheel 17a and the ring wheel 17c.

We claim:

1. A processing machine for processing wire and strip stock or for assembling components, comprising a drive unit with a drive housing (10) and with a distributor gearing (14) accommodated within said drive housing (10), where the drive housing (10) comprises two mutually opposite and mutually substantially parallel first and second drive housing face walls (10c, 10d) and at least one drive housing front wall (10a, 10b) substantially orthogonal to said drive housing face walls (10c, 10d), wherein said distributor gearing (14) comprises adjacent the first drive housing face wall (10c), at least one first shaft connection (14k, 14u) with an axis of rotation substantially perpendicular to said first drive housing face wall (10c), said first drive housing face wall (10c) is formed in a surrounding region of said at least one shaft connection (14k, 14u) for the attachment of a first housing box (18, 20) of said processing machine attached thereto, said first housing box (18, 20) comprises a face wall attachment face (20e) for attachment to said first drive housing face wall (10c) and at least one housing box front wall (20a, 20b) substantially parallel to said at least one drive housing front wall (10a, 10b), and mounted in said first housing box (18, 20) there is at least one housing box shaft (30) connected to said at least one first shaft connection (14k, 14u) and extending with its axis substantially orthogonally to said face wall attachment face (20e), wherein on said at least one housing box front wall (20a, 20b) there are provided at least two securing locations for a processing or assembling unit (32) of said processing machine and in said at least one housing box front wall (20a, 20b) at least two openings (20h, 20i) are provided in allocation to respective ones of said at least two securing locations for the provision of drive connection means connecting a respective processing or assembling unit and said housing box shaft (30), said at least two securing locations and said at least two openings (20h, 20i) being mutually spaced in a direction orthogonal to said face wall attachment face (20e), said distributor gearing (14) comprises adjacent the second drive housing face wall (10d) at least one second shaft connection (14j, 14t) with an axis of rotation substantially at right angles to said second drive housing face wall (10d), and said second drive housing face wall (10d) having attached thereto in a region surrounding said at least one second shaft connection (14j, 14t) at least one second housing box (22, 24) with at least one further housing box shaft (30) rotatably mounted therein and substantially parallel to said housing box shaft (30) of said first housing box (18, 20), said at least one second housing box (22, 24) having at least one housing box front wall (24a) extending substantially parallel to said at least one further housing box shaft (30), said at least one housing box front wall (24a) of said at least one second housing box (22, 24) being provided with at least one securing location for at least one further processing or assembling unit (32) of said processing machine and being further provided with at least one opening (24h) for the provision of drive connection means connecting said at least one further processing or assembling unit (32) with said at least one further housing box shaft (30).

2. Processing machine according to claim 1, in which said at least one first shaft connection (14k) in said first drive housing face wall (10c) and said at least one second shaft connection (14j) in said second drive housing face wall (10d) are arranged in axial alignment with one another.

3. Processing machine according to claim 1, in which said first drive housing face wall (10c) and said second said drive housing face wall (10d) are provided with two first shaft connections (14k, 14u) and two second shaft connections (14j, 14t), respectively, with spacing from one another, respective ones of said first shaft connections (14k, 14u) and said second shaft connections (14j, 14t) being in mutual alignment, said drive housing face walls (10c, 10d) being adapted in respective regions around said respective first (14k, 14u) and second (14j, 14t) shaft connections for securing respective first (18, 20) and second (22, 24) housing boxes thereto.

4. Processing machine according to claim 1, in which said at least one housing box front wall (20a, 20b) of at least a part of said first (18, 20) and second (22, 24) housing boxes lies substantially flush with said at least one drive housing front wall (10a, 10b).

5. Processing machine according to claim 1, in which said at least one drive housing (10) comprises first (10a) and second (10b) drive housing front walls substantially parallel to and spaced from each other.

6. Processing machine according to claim 1, in which at least one of said first and second housing boxes (18 and 24) comprises, at its end remote from said respective face wall attachment face (20e), an end box attachment face (20g) for attachment to a face wall of an end box (26, 28) of said processing machine.

7. Processing machine according to claim 1, in which at least one of said first and second housing boxes (18 and 24), when regarded in a direction parallel to a respective housing box shaft (30) thereof, possesses a substantially rectangular outline which is formed by two mutually parallel front walls (20a, 20b) spaced from one another and two connecting walls (20c, 20d) connecting said two mutually parallel front walls (20a, 20b).

8. Processing machine according to claim 7, in which respective mutually adjacent connecting walls (20d, 20c) of two housing boxes (18, 20) attached to a common housing face wall (10c) form at least one passage (42) between them.

9. Processing machine according to claim 1, in which at least one of a driving housing (10) and an end box (26, 28) of said processing machine is shaped as a vertical column.

10. Processing machine according to claim 9, in which said two housing boxes (18, 20, 22, 24) are arranged one above another on at least one of said drive housing face walls (10c, 10d) of said drive housing (10).

11. Processing machine according to claim 1, in which at least one of said drive housing (10) and said end box (26, 28) of said processing machine is arranged on a base carrier (12).

12. Processing machine according to claim 1, in which said distributor gearing (14) comprises at least one distributor shaft (14f, 14r) which, extending from said first drive housing face wall (10c) to said second drive housing face wall (10d), connects a first shaft connection (14k, 14u) and a second shaft connection (14j, 14t) with one another.

13. Processing machine according to claim 12, in which said distributor gearing (14) comprises two mutually parallel and mutually spaced distributor shafts (14f, 14r) extending between said first gear housing face wall (10c) and said second gear housing face wall (10d), each of said mutually spaced distributor shafts (14f, 14r) connecting a respective first shaft connection (14k, 14u) and a respective second shaft connection (14j, 14t) with one another.

14. Processing machine according to claim 13, in which said two distributor shafts (14f, 14r) are connected for common rotation with respective distributor toothed wheels (14l, 14q), an intermediate toothed wheel (14n) being mounted on an intermediate shaft (14o) rotatably mounted in said drive housing (10), one of said distributor shafts (14f, 14r) being drivingly connected with a drive motor (16) through a transmission gear (14h, 14i).

15. Processing machine according to claim 14, in which said intermediate shaft (14o) is formed at one end (48a, 52a) at least for the drive of an auxiliary shaft (48b, 52c).

16. Processing machine according to claim 15, in which said auxiliary shaft (48b, 52c) is mounted between two housing boxes attached to a common drive housing face wall (10c, 10d) and is drivingly connected with a transport apparatus (48, 52) which is adapted to transport workpieces along a transport path substantially perpendicular to respective front walls (20a, 20b) of said two housing boxes (18, 20, 22, 24) attached to said common drive housing face wall and extending between said two housing boxes.

17. Processing machine according to claim 1, in which at least a part of said shaft connections (14k, 14u, 14j, 14t) are formed as separator couplings and said first and second housing boxes (18, 20, 22, 24) are detachably connected with at least one of said drive housing (10) and an end box (26, 28) of said processing machine.

18. Processing machine according to claim 1, in which said at least one housing box shaft (30) is formed as a worm shaft engageable with a worm wheel (34a) of a respective processing or assembling unit (32).

19. Processing machine according to claim 18, in which said worm wheel (34a) is arranged in a respective housing box on a worm wheel shaft (34) which is constantly mounted in said housing box, and said worm wheel shaft (34) on at least one end thereof comprises a separator coupling element (32c) adapted for being connected with a drive shaft (32b) of the respective processing or assembling unit (32).

20. Processing machine according to claim 1, in which at least one of said first and second housing box shafts (30a, 30b) is formed as a worm shaft and is divided into a plurality of worm shaft sections (30a, 30b) which are mounted in a respective housing box (20) by respective mounting means and connected with one another by respective separator couplings (30d).

21. Processing machine according to claim 1, in which at least one housing box front wall (20a) is adapted for attachment of a stamping press thereto.

22. Processing machine according to claim 1, in which said at least one housing box front wall (20a) is adapted for attaching a strip feed device (36) thereto.

23. Processing machine according to claim 1, in which the rotation rate of at least one of said processing or assembling units (32) is geared down compared with the rotation rate of said at least one housing box shaft (30), with a step-down ratio of 1:2 to 1:20.

24. Processing machine according to claim 1, in which the rotation rate of at least one of said processing or assembling units (32) is geared down compared with the rotation rate of said at least one housing box shaft (30), with a step-down ratio of 1:4 to 1:10.

25. Processing machine according to claim 1, in which a drive motor (16) is connected with said distributor gearing (14) through a combined brake-coupling device.

26. Processing machine according to claim 1, in which one of said first and said second housing boxes (18, 20) is replaced by at least one of a deflector housing and a distributor housing (270, 272).

27. Processing machine according to claim 26, in which said at least one of said deflector housing and said distributor housing (270, 272) is equipped with rotation rate-varying gear means (274).

28. Processing machine according to claim 1, in which said at least one first shaft connection (14k, 14u) and said at least one second shaft connection (14j, 14t) are driven at different rotation rates.

29. Processing machine according to claim 28, in which said at least one first shaft connection (14k, 14u) and said at least one second shaft connection (14j, 14t) are driven with rotation rates differing according to an integral ratio.

30. Processing machine according to claim 28, in which said at least one first shaft connection (14k, 14u) and said at least one second shaft connection (14j, 14t) are driven as a pair by a respective distributor shaft (14f, 14r), said distributor shaft (14f, 14r) being connected with at least one of said first and second shaft connections (14k, 14u, 14j, 14t) through one of a step-up and step-down intermediate gear (15, 17).

31. Processing machine according to claim 30, in which each of at least two pairs of a respective first shaft connection (14k, 14u) and a respective second shaft connection (14j, 14t) comprises a respective common distributor shaft (14f, 14r), and in which both said distributor shafts (14f, 14r) are connected for common rotation with a respective distributor toothed wheel (14l, 14q), wherein between said distributor toothed wheels (14*l*, 14*q*) an intermediate toothed wheel (14*n*) is mounted on an intermediate shaft (14*o*) rotatably mounted in said drive housing (10), and one of said distributor shafts (14*f*, 14*r*) is in drive connection through a transmission gear (14*h*, 14*i*, 14*e*, 14*a*) with a drive motor (16).

32. Processing machine according to claim 31, in which the intermediate shaft (14*o*) is adapted at least one end (48*a*, 52*a*) thereof for driving a respective auxiliary shaft (48*a*, 52*c*).

33. Processing machine according to claim 32, in which said auxiliary shaft (48*b*, 52*c*) is driven with a rotation rate different from the rotation rate of said intermediate shaft (14*o*).

34. A processing machine for processing wire and strip stock or for assembling components, comprising a drive unit with a drive housing (10) and with a distributor gearing (14) accommodated within said drive housing (10), wherein said drive housing (10) comprises two mutually opposite and mutually substantially parallel first and second drive housing face walls (10*c*, 10*d*) and at least one drive housing front wall (10*a*, 10*b*) substantially orthogonal to said drive housing face walls (10*c*, 10*d*), said distributor gearing (14) comprises adjacent the first drive housing face wall (10*c*) at least one first shaft connection (14*k*, 14*u*) with an axis of rotation substantially perpendicular to said first drive housing face wall (10*c*), said first drive housing face wall (10*c*) is provided in a surrounding region of said at least one first shaft connection (14*k*, 14*u*) with first attachment means for the attachment of at least one housing box (18, 20), said at least one housing box (18, 20) comprises a housing box attachment face (20*e*) for the attachment of said at least one housing box to said first drive housing face wall (10*c*) with at least one housing box front wall (20*a*, 20*b*) substantially parallel to said at least one drive housing front wall (10*a*, 10*b*), and mounted in said at least one housing box (18, 20) there is at least one housing box shaft (30) provided with coupling means for being coupled to said at least one first shaft connection (14*k*, 14*u*) and extending with its axis substantially orthogonally to said housing box attachment face (20*e*), wherein on said at least one housing box front wall (20*a*, 20*b*) there is provided at least one securing location for a processing or assembling unit of said processing machine and in said at least one housing box front wall (20*a*, 20*b*) at least one opening (20*h*, 20*i*) is provided for the provision of drive connection means connecting a said processing or assembling unit and said at least one housing box shaft (30), said distributor gearing (14) comprises adjacent a second one of said two drive housing face walls (10*c*, 10*d*) at least one second shaft connection (14*j*, 14*t*) with an axis of rotation substantially at right angles to said second drive housing face wall (10*d*), and said second drive housing face wall (10*d*) comprises second attachment means for the attachment of at least one gear unit (22, 24), said at least one gear unit (22, 24) having a gear housing with internal gear means therein, said gear housing having a gear housing front wall (24*a*) and a gear housing attachment face for the attachment of said at least one gear unit to said second drive housing face wall (10*d*), said internal gear means having entrance shaft means with an axis of rotation substantially at right angles to said gear housing attachment face, said entrance shaft means having entranced shaft coupling means for being coupled to said at least one second shaft connection (14*t*, 14*j*), at least one of said housing boxes (18, 20) and said gear units (22, 24) having a respective end box attachment face (20*g*) remote from a respective housing box attachment face (20*e*) and gear housing attachment face, respectively, in engagement with a respective end box (26, 28).

35. A processing machine for processing wire and strip stock or for assembling components, said processing machine comprising a drive unit with a drive housing (10) and with a distributor gearing (14) accommodated within said drive housing (10), wherein said drive housing (10) comprises two mutually opposite and mutually substantially parallel first and second drive housing face walls (10*c*, 10*d*) and at least one drive housing front wall (10*a*, 10*b*) substantially orthogonal to said drive housing face walls (10*c*, 10*d*), said distributor gearing (14) comprises adjacent the first drive housing face wall (10*c*) at least one first shaft connection (14*k*, 14*u*) with an axis of rotation substantially perpendicular to said first drive housing face wall (10*c*), said first drive housing face wall (10*c*) is provided in a surrounding region of said at least one first shaft connection (14*k*, 14*u*) with first attachment means for the attachment of at least one housing box (18, 20), said at least one housing box (18, 20) comprises a housing box attachment face (20*e*) for the attachment of said at least one housing box to said first drive housing face wall (10*c*) with at least one housing box front wall (20*a*, 20*b*), substantially parallel to said at least one drive housing front wall (10*a*, 10*b*), and in said at least one housing box (18, 20) there is mounted at least one housing box shaft (30) provided with coupling means for being coupled to said at least one first shaft connection (14*k*, 14*u*) and extending substantially axially orthogonally to said housing box attachment face (20*e*), said at least one housing box front wall (20*a*, 20*b*) providing at least one securing location for a processing or assembling unit of said processing machine, in said at least one housing box front wall (20*a*, 20*b*) at least one opening (20*h*, 20*i*) is provided for the provision of drive connection means connecting said processing or assembling unit and said housing box shaft (30), and said distributor gearing (14) comprises adjacent the second of said two drive housing face walls (10*c*, 10*d*) at least one second shaft connection (14*j*, 14*t*) with an axis of rotation substantially at right angles to said second drive housing face wall (10*d*), said second drive housing face wall (10*d*) comprises second attachment means for the attachment of at least one gear unit (22, 24), said at least one gear unit (22, 24) having a gear housing with internal gear means therein, said gear housing having a gear housing front wall (24*a*) and a gear housing attachment face for the attachment of said at least one gear unit to said second drive housing face wall (10*d*), said internal gear means having entrance shaft means, said entrance shaft means having an axis of rotation substantially at right angles to said gear housing attachment face, said entrance shaft means having entrance shaft coupling means for being coupled to said at least one second shaft connection (14*t*, 14*j*), and said drive housing (10) being a vertical column.

* * * * *